United States Patent
Zhang et al.

(10) Patent No.: US 12,026,299 B2
(45) Date of Patent: Jul. 2, 2024

(54) ADAPTIVE INTELLIGENT HEAD-HAND VR SYSTEM AND METHOD

(71) Applicant: QINGDAO PICO TECHNOLOGY CO., LTD., Shangdong (CN)

(72) Inventors: Xiuzhi Zhang, Shandong (CN);
Hongwei Zhou, Shandong (CN);
Guanghui Liu, Shandong (CN);
Hengjiang Guo, Shandong (CN)

(73) Assignee: QINGDAO PICO TECHNOLOGY CO., LTD. (CN)

( * ) Notice: Subject to any disclaimer, the term of this patent is extended or adjusted under 35 U.S.C. 154(b) by 0 days.

(21) Appl. No.: 17/884,973

(22) Filed: Aug. 10, 2022

(65) Prior Publication Data

US 2023/0288982 A1    Sep. 14, 2023

Related U.S. Application Data

(63) Continuation of application No. PCT/CN2021/118544, filed on Sep. 15, 2021.

(51) Int. Cl.
*G06F 3/01* (2006.01)
*G02B 27/01* (2006.01)
*G06T 7/70* (2017.01)

(52) U.S. Cl.
CPC .......... *G06F 3/011* (2013.01); *G02B 27/0172* (2013.01); *G06T 7/70* (2017.01)

(58) Field of Classification Search
None
See application file for complete search history.

(56) References Cited

U.S. PATENT DOCUMENTS

2018/0284882 A1\*  10/2018  Shipes ................ G06F 3/012
2019/0179146 A1    6/2019  De Nardi

FOREIGN PATENT DOCUMENTS

| CN | 106772234 A | 5/2017 |
|----|-------------|--------|
| CN | 108196258 A | 6/2018 |
| CN | 111174683 A | 5/2020 |
| CN | 112181138 A | 1/2021 |

\* cited by examiner

*Primary Examiner* — Brian M Butcher

(57) ABSTRACT

An adaptive VR system is provided, which includes a headset and a handle, the headset comprises a headset camera, a control end, and an electromagnetic receiving module, and the control end comprises a control end database and a data selection module; the handle comprises a handle camera and an electromagnetic transmitting module; the headset camera is configured to acquire an external environment image in a headset coordinate system; the handle camera is configured to acquire an external environment image in a handle coordinate system; the control end database is configured to store the external environment image of the handle coordinate system; the data selection module is configured to determine a tracking mode used for tracking the handle, the tracking mode comprising optical tracking; and the electromagnetic receiving module is connected to the data selection module.

16 Claims, 2 Drawing Sheets

ADAPTIVE INTELLIGENT HEAD-HAND VR SYSTEM AND METHOD

CROSS-REFERENCE TO RELATED APPLICATION

The present disclosure is a continuation of International Patent Application No. PCT/CN2021/118544, filed Sep. 15, 2021, which claims priority to Chinese patent application No. CN202010973590.1, filed on Sep. 16, 2020 and entitled "Adaptive Intelligent Head-Hand VR System and Method", the disclosure of each of which is hereby incorporated by reference in its entirety.

TECHNICAL FIELD

Embodiments of the present disclosure relate to the field of computer vision, and in particular, to an adaptive intelligent head-hand Virtual Reality (VR) system and method.

BACKGROUND

At present, in the field of VR vision, most of the existing all-in-one VR 6DOF designs support head 6DOF tracking, and a relative position relationship between a headset and a handle is judged through optical, ultrasonic, electromagnetic and other solutions. On the basis of the current headset, the position of the handle is converted into a world coordinate system of the handle through the mapping of a relative relationship. In the above solutions, optical tracking has optical limitations, ultrasonic tracking has Field Of View (FOV) limitations, external reflection, shielding and other interference problems, and electromagnetic tracking also has external magnetic field interference problems. There is no solution capable of solving the above problems in the existing product applications.

Therefore, there is a need for an adaptive intelligent head-hand VR system which can solve the problems of optical limitations and the non-availability of an electromagnetic handle when the magnetic field intensity is high.

SUMMARY

In view of the above problems, an embodiment of the present disclosure provides an adaptive intelligent head-hand VR system, so as to solve the existing all-in-one VR 6DOF design problems such as FOV limitations when the optical tracking is used, FOV limitations, external reflection, shielding and other interference problems when the ultrasonic tracking is used, and external magnetic field interference problems when electromagnetic tracking is used, thus resulting in poor anti-interference ability and low accuracy of the VR system.

The adaptive intelligent head-hand VR system provided according to the embodiment of the present disclosure includes a headset, a handle matched with the headset, a control end, and an electromagnetic module.

A headset camera is arranged on the headset, and the headset camera is configured to acquire an external environment image in a headset coordinate system.

A handle camera is arranged on the handle, and the handle camera is configured to acquire an external environment image in a handle coordinate system.

The control end includes a control end database and a data selection module.

The control end database is configured to store the external environment image of the handle coordinate system.

The data selection module is configured to judge a tracking mode used for tracking the handle, and the tracking mode includes optical tracking.

The electromagnetic module is connected to the data selection module. If the optical tracking is used, the electromagnetic module is configured to perform coordinate system conversion on the external environment image of the headset coordinate system and the external environment image of the handle coordinate system, so that the external environment image acquired by the headset camera and the external environment image acquired by the handle camera are in the same coordinate system, and the optical tracking is completed.

In an exemplary embodiment, the control end is arranged on the headset.

In an exemplary embodiment, the electromagnetic module includes an electromagnetic transmitting module and an electromagnetic receiving module, the electromagnetic transmitting module is configured to transmit an electromagnetic signal, and the electromagnetic receiving module is configured to receive the electromagnetic signal transmitted by the electromagnetic transmitting module.

In an exemplary embodiment, the electromagnetic transmitting module is arranged on the handle.

The electromagnetic receiving module is arranged on the headset.

In an exemplary embodiment, the tracking mode further includes electromagnetic tracking.

If the electromagnetic tracking is used, the electromagnetic receiving module arranged on the headset receives the electromagnetic signal transmitted by the electromagnetic transmitting module arranged on the handle to complete the electromagnetic tracking of the handle.

In an exemplary embodiment, the headset and the handle further include an IMU sensor module which includes at least a gravity acceleration sensor and a gyroscope and is configured to acquire tracking information and position prediction information about the headset and the handle.

In an exemplary embodiment, a wireless chip is further included.

The wireless chip includes a headset wireless chip arranged on the headset and a handle wireless chip arranged on the handle, and the handle wireless chip is matched with the headset wireless chip and configured to transmit wireless information.

The wireless information at least includes the external environment image of the handle coordinate system, key information about the handle, IMU sensing information about the handle acquired by the IMU sensor module, and synchronization information about a time system of the headset and a time system of the handle.

In an exemplary embodiment, the data selection module selects whether the handle is tracked by optical tracking or electromagnetic tracking according to a preset threshold and an update accuracy of the external environment image of the handle coordinate system in the control end database.

In an exemplary embodiment, if the update accuracy of the external environment image in the control end database is not less than a preset accuracy standard value and an optical FOV of the handle camera is within the range of the threshold, the optical tracking is automatically selected.

If the update accuracy of the external environment image in the control end database is less than a preset accuracy standard value or an optical FOV of the handle camera is out of the range of the threshold, the electromagnetic tracking is automatically selected.

An adaptive intelligent head-hand VR operation method based on the above adaptive intelligent head-hand VR system is also provided according to an embodiment of the present disclosure. The method includes the following steps.

An external environment image in a headset coordinate system and an external environment image in a handle coordinate system are respectively acquired by a headset camera and a handle camera, and the external environment image of the handle coordinate system is stored in a control end database.

A tracking mode used for tracking a handle is judged according to an update accuracy of the external environment image of the handle coordinate system in the control end database. The tracking mode includes optical tracking and electromagnetic tracking.

If the optical tracking is used, coordinate system conversion is performed on the external environment image of the headset coordinate system and the external environment image of the handle coordinate system, so that the external environment image acquired by the headset camera and the external environment image acquired by the handle camera are in the same coordinate system, and the optical tracking is completed.

If the electromagnetic tracking is used, an electromagnetic receiving module arranged on a headset receives an electromagnetic signal transmitted by an electromagnetic transmitting module arranged on the handle to complete the electromagnetic tracking of the handle.

It can be seen from the above technical solutions that according to the adaptive intelligent head-hand VR operation system and method provided by the embodiments of the present disclosure, a handle camera is mounted on a handle, so that the handle can also independently acquire an external environment image. Moreover, an electromagnetic module is arranged, so that both electromagnetic tracking and image tracking can be realized. Specifically, an external environment image in a headset coordinate system and an external environment image in a handle coordinate system are respectively acquired by a headset camera and a handle camera, and the external environment image of the handle coordinate system is stored in a control end database. Then, it is judged whether the handle is tracked by optical tracking or electromagnetic tracking. If the optical tracking is used, coordinate system conversion is performed on the external environment image of the headset coordinate system and the external environment image of the handle coordinate system, so that the external environment image acquired by the headset camera and the external environment image acquired by the handle camera are in the same coordinate system, and the optical tracking is completed. If the electromagnetic tracking is used, an electromagnetic receiving module arranged on a headset receives an electromagnetic signal transmitted by an electromagnetic transmitting module arranged on the handle to complete the electromagnetic tracking of the handle. This combination of optical and electromagnetic solutions not only solves the problem of optical limitations, but also solves the problem that an electromagnetic handle cannot be used when the magnetic field intensity is high. Through the combination of the two technologies, a high-precision and low-delay optical tracking solution is used within an optical range, and an electromagnetic solution supporting 360-degree tracking is used out of the optical range, which greatly improves the anti-interference and environmental adaptability of VR products.

BRIEF DESCRIPTION OF THE DRAWINGS

Other objects and results of the embodiments of the present disclosure will become more apparent and appreciated by reference to the following description taken in conjunction with the accompanying drawings, and as the embodiments of the present disclosure become more fully understood. In the drawings.

DETAILED DESCRIPTION OF THE EMBODIMENTS

Most of the existing all-in-one VR 6DOF designs support head 6DOF tracking. On the basis of the current headset, the position of the handle is converted into a world coordinate system of the handle through the mapping of a relative relationship, so as to complete tracking. In the above solutions, optical tracking has optical limitations, ultrasonic tracking has FOV limitations, external reflection, shielding and other interference problems, and electromagnetic tracking also has external magnetic field interference problems, thus resulting in the problems of weak anti-interference ability and low precision of VR products.

Aiming at the above problems, embodiments of the present disclosure provide an adaptive intelligent head-hand VR system. Specific embodiments of the present disclosure are described in detail below with reference to the accompanying drawings.

Figure 1:
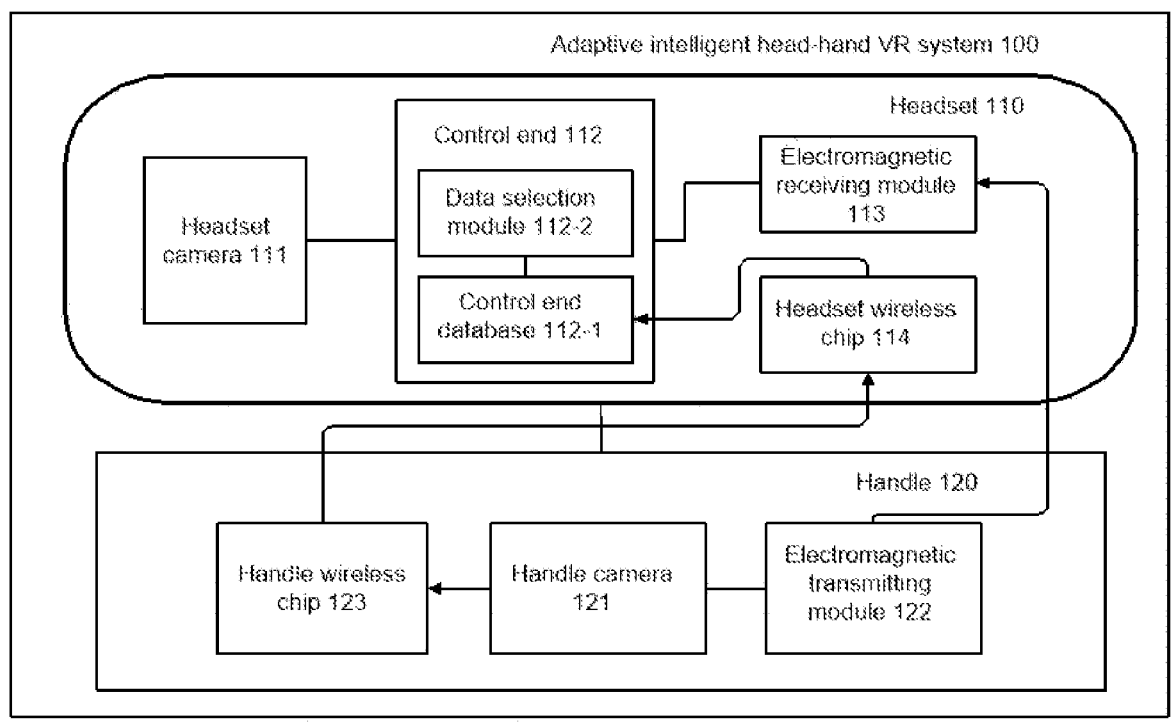
FIG. 1 is a system block diagram of an adaptive intelligent head-hand VR system according to an embodiment of the present disclosure.
Figure 2:
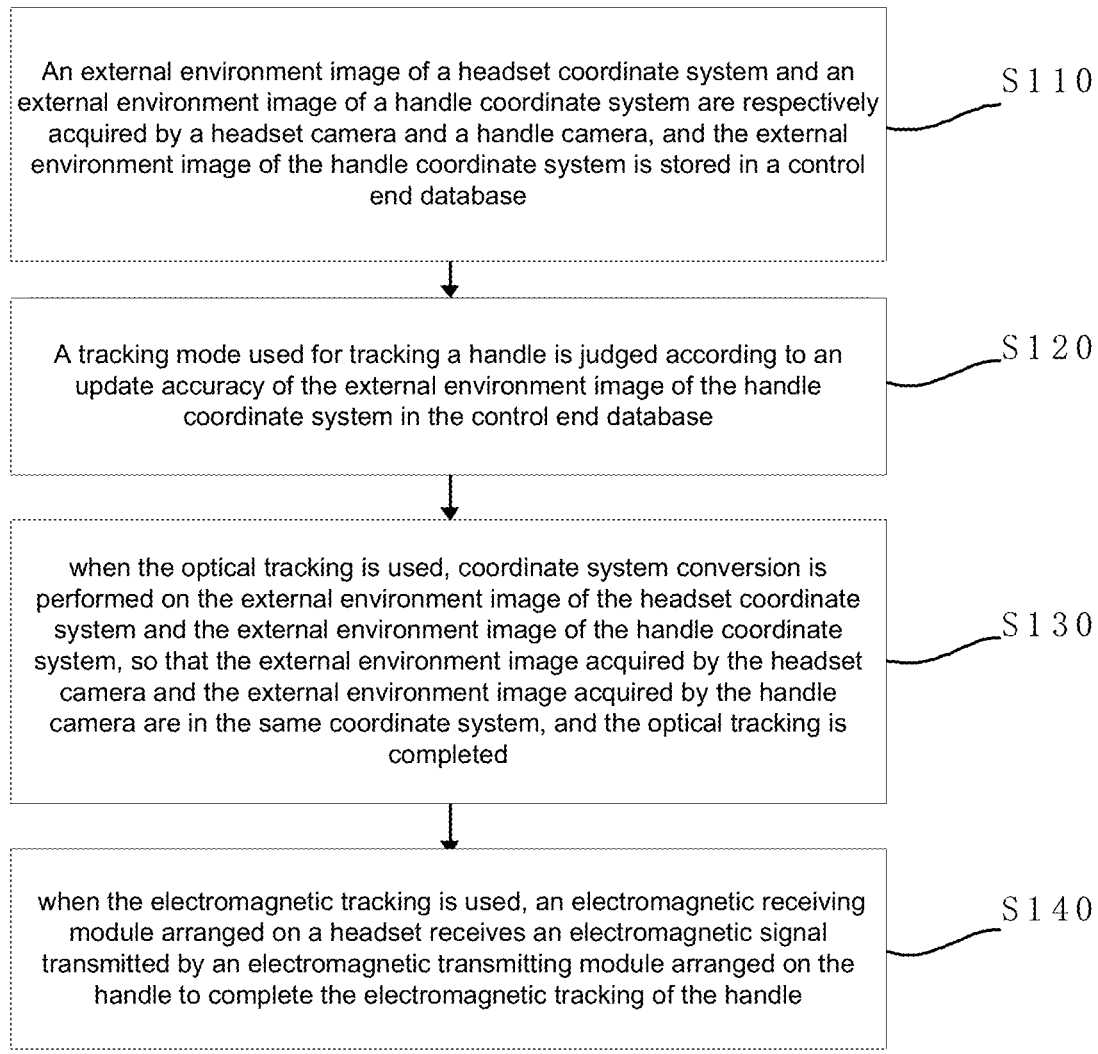
FIG. 2 is a method flowchart of an adaptive intelligent head-hand VR operation method according to an embodiment of the present disclosure.

In order to illustrate the adaptive intelligent head-hand VR system provided by the embodiment of the present disclosure, FIG. 1 exemplifies an adaptive intelligent head-hand VR system according to an embodiment of the present disclosure. FIG. 2 exemplifies an adaptive intelligent head-hand VR operation method according to an embodiment of the present disclosure.

The following description of exemplary embodiments is only illustrative actually, and is not used as any limitation for the embodiments of the present disclosure and the application or use thereof. Technologies and devices known by those of ordinary skill in the related art may not be discussed in detail. However, where appropriate, the technologies and the devices shall be regarded as part of the description.

As shown in FIG. 1, an embodiment of the present disclosure provides an adaptive intelligent head-hand VR system 100, including a headset 110, a handle 120 matched with the headset, a control end 112 and an electromagnetic module. A headset camera 111 is arranged on the headset 110, and the headset camera 111 is configured to acquire an external environment image in a headset coordinate system. A handle camera 121 is arranged on the handle 120, and the handle camera 121 is configured to acquire an external environment image in a handle coordinate system. It should be noted that the headset coordinate system and the handle coordinate system described herein are not geographical coordinates or data coordinates with the headset or the handle as an origin of a coordinate system, but different description modes of the position of the acquired external environment image in the headset or the handle, i.e. the headset has a separate positioning/description mode for the acquired external environment image and the handle also has its own separate positioning/description mode for the acquired external environment image. Although the headset and the handle acquire the same external environment, the external environment image of the headset coordinate system and the external environment image of the handle coordinate system are located in different coordinate systems, and the description modes are different. The external environment image of the headset coordinate system reflects a relative relationship between the headset and the external environment, and the external environment image of the handle coordinate system reflects a relative relationship between the handle and the external environment, so that a relative relationship between the headset and the handle can be derived, thereby enabling the headset to complete the position and dynamic tracking of the handle.

In the embodiment shown in FIG. 1, the control end 112 includes a control end database 112-1 and a data selection module 112-2. A specific arrangement position of the control end 112 is not particularly limited. In the present embodiment, the control end 112 is arranged on the headset 110. The control end database 112-1 in the control end 112 is configured to store the external environment image of the handle coordinate system. The data selection module 112-2 in the control end 112 is configured to judge a tracking mode used for tracking the handle 120. The tracking mode includes optical tracking and electromagnetic tracking. In the present embodiment, the data selection module 112-2 selects whether the handle is tracked by optical tracking or electromagnetic tracking according to a preset threshold and an update accuracy of the external environment image of the handle coordinate system in the control end database 112-1. If the update accuracy of the external environment image in the control end database 112-1 is not less than a preset accuracy standard value, it indicates that the external environment image in the control end database 112-1 is updated accurately, and if the external environment image in the control end database 112-1 is updated accurately and an optical FOV of the handle camera 121 is within the range of the preset threshold, optical tracking is automatically selected. If the update accuracy of the external environment image in the control end database 112-1 is less than the preset accuracy standard value, it indicates that the update of the external environment image in the control end database 121-1 deviates, if the update of the external environment image in the control end database 121-1 deviates or the optical FOV of the handle camera 121 is out of the range of the preset threshold, the electromagnetic tracking is automatically selected. The accuracy standard value is preset in advance, and the standard value may include picture resolution, definition, contrast and brightness. Specific values are not particularly limited. For example, in an initial start-up phase and in a phase where the control end database 121-1 is not ready, the electromagnetic tracking is used to ensure the basic functions of 6DOF tracking. When the headset 110 and the control end database 121-1 are in an update stage, it is checked whether the external environment image in the control end database 121-1 is updated accurately through electromagnetic data, and if the update is accurate, the electromagnetic tracking is converted into the optical tracking with higher accuracy. When the optical FOV has exceeded the preset threshold during optical shielding, the electromagnetic tracking is used, and the deviation of a tracking position is corrected in real time through electromagnetic data. In a scenario where the rapid movement of the handle has great influence on the optical accuracy, the electromagnetic tracking is used, and the deviation of an Inertial Measurement Unit (IMU) tracking position is corrected in real time through electromagnetic data.

In the embodiment shown in FIG. 1, the electromagnetic module is connected to the data selection module 121-2. If the optical tracking is used, the electromagnetic module is configured to perform coordinate system conversion on the external environment image of the headset coordinate system and the external environment image of the handle coordinate system, so that the external environment image acquired by the headset camera and the external environment image acquired by the handle camera are in the same coordinate system, so as to judge a positional relationship of the handle relative to the headset and then complete the optical tracking.

In the embodiment shown in FIG. 1, the electromagnetic module includes an electromagnetic transmitting module 122 and an electromagnetic receiving module 113. The electromagnetic transmitting module 122 is configured to transmit an electromagnetic signal, and the electromagnetic receiving module 113 is configured to receive the electromagnetic signal transmitted by the electromagnetic transmitting module 122. In the present embodiment, the electromagnetic transmitting module 122 is arranged on the handle 120, and the electromagnetic receiving module 113 is arranged on the headset 110, so that the headset 110 can realize electromagnetic tracking on the handle 120. If the handle 120 is tracked by electromagnetic tracking, the electromagnetic receiving module 113 arranged on the headset 110 receives the electromagnetic signal transmitted by the electromagnetic transmitting module 122 arranged on the handle 120 so as to complete the electromagnetic tracking of the handle. Specifically, the electromagnetic transmitting module 122 generates three sinusoidal signals with different frequencies on an X axis, a Y axis and a Z axis, and generates an induced electromotive force on an X' axis, a Y' axis and a Z' axis of the electromagnetic receiving module 113 due to the change of the magnetic induction intensity so as to receive three paths of induced signals. By using a 6DOF positioning algorithm, relative position information and relative attitude information about the electromagnetic transmitting module 122 and the electromagnetic receiving module 113 are calculated. The electromagnetic receiving module 113 is fixed on the headset 110, and has a fixed coordinate system relationship with a display screen on the headset 110. Through coordinate system conversion, a coordinate relationship between the electromagnetic transmitting module 122 and the display screen on the headset 110 may be calculated, so as to realize a 6DOF function of the handle 120.

In the embodiment shown in FIG. 1, the headset 110 and the handle 120 further include an IMU sensor module (not shown) which includes at least a gravity acceleration sensor and a gyroscope and is configured to acquire tracking information and position prediction information about the headset and the handle.

The adaptive intelligent head-hand VR system shown in FIG. 1 further includes a wireless chip. The wireless chip includes a headset wireless chip 114 arranged on the headset 110 and a handle wireless chip 123 arranged on the handle 120. The handle wireless chip 123 is matched with the headset wireless chip 114 and is configured to transmit wireless information. The wireless information at least includes the external environment image of the handle coordinate system, key information about the handle, IMU sensing information about the handle acquired by the IMU sensor module, and synchronization information about a time system of the headset and a time system of the handle, so as to complete information transmission between the headset 110 and the handle 120.

In addition, in the embodiment shown in FIG. 1, cameras in the adaptive intelligent head-hand VR system include a public address and a private address. The public address is a broadcast address, and is configured to perform a fast write operation on multiple cameras with the same configuration. The private address is configured to perform a special configuration and a camera register read operation on a camera requiring a special configuration. In the present embodiment, each camera has two I2C device addresses: one public address and one private address. One I2C is used to drive multiple cameras. During initialization, camera 1, camera 2, camera 3 and camera 4 work successively through RST pins. When each camera works, broadcast addresses and private addresses of four cameras are respectively set. After the setting of I2C addresses of the four cameras is completed, the initialization of the four cameras is quickly completed through the broadcast addresses and the private addresses.

In the embodiment shown in FIG. 1, after a sensor of the camera in the adaptive intelligent head-hand VR system receives an FSIN signal, an output clock is reset, and MIPI data is output after a period of time. The FSIN signal does not change the generated signal. In order to ensure the stability of the system, the FSIN signal can complete a synchronization function after an exposure signal ends and before a Vsync signal is output, which not only ensures the synchronization function, but also ensures the stability of the signal. The synchronization signal may be the same as a Camera frame rate signal, or may be 1/2 of a frame rate, etc.

It can be seen from the above implementation that the adaptive intelligent head-hand VR system provided by the embodiment of the present disclosure includes a headset, a handle, a control end and an electromagnetic module. A headset camera is arranged on the headset to acquire an external environment image in a headset coordinate system. A handle camera is arranged on the handle to acquire an external environment image in a handle coordinate system. The control end includes a control end database for storing the external environment image of the handle coordinate system and a data selection module configured to judge whether the handle is tracked by optical tracking or electromagnetic tracking. The electromagnetic module is connected to the data selection module. If the handle is tracked by optical tracking, the electromagnetic module is configured to perform coordinate system conversion on the external environment image of the headset coordinate system and the external environment image of the handle coordinate system, so that the external environment image acquired by the headset camera and the external environment image acquired by the handle camera are in the same coordinate system to complete optical tracking, thus not only solving the problem of optical limitations, but also solving the problem that an electromagnetic handle cannot be used when the magnetic field intensity is high. Through the combination of the two technologies, a high-precision and low-delay optical tracking solution is used within an optical range, and an electromagnetic solution supporting 360-degree tracking is used out of the optical range, which greatly improves the anti-interference and environmental adaptability of VR products and improves the immersion of users during use.

Corresponding to the foregoing adaptive intelligent head-hand VR system, an embodiment of the present disclosure also provides an adaptive intelligent head-hand VR operation method. FIG. 2 shows a flowchart of an adaptive intelligent head-hand VR operation method according to an embodiment of the present disclosure.

As shown in FIG. 2, the embodiment of the present disclosure provides an adaptive intelligent head-hand VR operation method based on the above adaptive intelligent head-hand VR system. The method includes the following steps.

In S110, an external environment image in a headset coordinate system and an external environment image in a handle coordinate system are respectively acquired by a headset camera and a handle camera, and the external environment image of the handle coordinate system is stored in a control end database.

In S120, a tracking mode used for tracking a handle is judged according to an update accuracy of the external environment image of the handle coordinate system in the control end database. The tracking mode includes optical tracking and electromagnetic tracking.

In S130, if the optical tracking is used, coordinate system conversion is performed on the external environment image of the headset coordinate system and the external environment image of the handle coordinate system, so that the external environment image acquired by the headset camera and the external environment image acquired by the handle camera are in the same coordinate system, and the optical tracking is completed.

In S140, if the electromagnetic tracking is used, an electromagnetic receiving module arranged on a headset receives an electromagnetic signal transmitted by an electromagnetic transmitting module arranged on the handle to complete the electromagnetic tracking of the handle.

It can be seen from the above implementation that according to the adaptive intelligent head-hand VR operation method provided by the embodiment of the present disclosure, a handle camera is mounted on a handle, so that the handle can also independently acquire an external environment image. Moreover, an electromagnetic module is arranged, so that both electromagnetic tracking and image tracking can be realized. Specifically, an external environment image in a headset coordinate system and an external environment image in a handle coordinate system are respectively acquired by a headset camera and a handle camera, and the external environment image of the handle coordinate system is stored in a control end database. Then, it is judged whether the handle is tracked by optical tracking or electromagnetic tracking according to an update accuracy of the external environment image of the handle coordinate system in the control end database. If the optical tracking is used, coordinate system conversion is performed on the external environment image of the headset coordinate system and the external environment image of the handle coordinate system, so that the external environment image acquired by the headset camera and the external environment image acquired by the handle camera are in the same coordinate system, and the optical tracking is completed. If the electromagnetic tracking is used, an electromagnetic receiving module arranged on a headset receives an electromagnetic signal transmitted by an electromagnetic transmitting module arranged on the handle to complete the electromagnetic tracking of the handle. This combination of optical and electromagnetic solutions not only solves the problem of optical limitations, but also solves the problem that an electromagnetic handle cannot be used when the magnetic field intensity is high. Through the combination of the two technologies, a high-precision and low-delay optical tracking solution is used within an optical range, and an electromagnetic solution supporting 360-degree tracking is used out of the optical range, which greatly improves the anti-interference and environmental adaptability of VR products.

An embodiment of the present disclosure also provides a computer-readable storage medium. The computer-readable storage medium stores a computer program. The computer program is configured to perform, when executed, the steps in any one of the above method embodiments.

An embodiment of the present disclosure also provides an electronic device, which includes a memory and a processor. The memory stores a computer program. The processor is configured to run the computer program to perform the steps in any one of the above method embodiments.

The adaptive intelligent head-hand VR system and method proposed according to the embodiments of the present disclosure are described above by way of example with reference to the accompanying drawings. However, those skilled in the art should understand that various improvements can be made to the adaptive intelligent head-hand VR system and method proposed in the embodiments of the present disclosure, without departing from the content of the present disclosure. Therefore, the scope of protection of the present disclosure should be determined by the content of the appended claims.

What is claimed is:

1. An adaptive Virtual Reality (VR) system, comprising: a headset, a handle matched with the headset, wherein
   the headset comprises a headset camera, a control end, and an electromagnetic receiving module, and the control end comprises a control end database and a data selection module;
   the handle comprises a handle camera and an electromagnetic transmitting module;
   the headset camera is configured to acquire an external environment image in a headset coordinate system;
   the handle camera is configured to acquire an external environment image in a handle coordinate system;
   the control end database is configured to store the external environment image of the handle coordinate system;
   the data selection module is configured to determine a tracking mode used for tracking the handle, the tracking mode comprising optical tracking; and
   the electromagnetic receiving module is connected to the data selection module, if the optical tracking is used, the electromagnetic receiving module is configured to perform coordinate system conversion on the external environment image of the headset coordinate system and the external environment image of the handle coordinate system, so that the external environment image acquired by the headset camera and the external environment image acquired by the handle camera are in the same coordinate system, and the optical tracking is completed.

2. The adaptive VR system according to claim 1, wherein the electromagnetic transmitting module is configured to transmit an electromagnetic signal, and the electromagnetic receiving module is configured to receive the electromagnetic signal transmitted by the electromagnetic transmitting module.

3. The adaptive VR system according to claim 1, wherein the tracking mode further comprises electromagnetic tracking, and in a case that the electromagnetic tracking is used, the electromagnetic receiving module arranged on the headset is configured to receive the electromagnetic signal transmitted by the electromagnetic transmitting module arranged on the handle to complete the electromagnetic tracking of the handle.

4. The adaptive VR system according to claim 1, wherein the headset further comprises a first Inertial Measurement Unit (IMU) sensor module which comprises at least a gravity acceleration sensor and a gyroscope, and IMU sensor module is configured to acquire tracking information and position prediction information about the headset;
   the handle further comprises a second IMU sensor module which comprises at least a gravity acceleration sensor and a gyroscope, and the second IMU sensor module is configured to acquire tracking information and position prediction information about the handle.

5. The adaptive VR system according to claim 4, wherein the headset further comprises a headset wireless chip and the handle further comprises a handle wireless chip, the handle wireless chip being matched with the headset wireless chip and configured to transmit wireless information; and
   the wireless information at least comprises the external environment image of the handle coordinate system, key information about the handle, IMU sensing information about the handle acquired by the IMU sensor module, and synchronization information about a time system of the headset and a time system of the handle.

6. The adaptive VR system according to claim 1, wherein the data selection module is configured to select optical tracking or electromagnetic tracking to track the handle according to a preset threshold and an update accuracy of the external environment image of the handle coordinate system in the control end database.

7. The adaptive VR system according to claim 1, wherein in a case that an update accuracy of the external environment image in the control end database is not less than a preset accuracy standard value and an optical Field Of View (FOV) of the handle camera is within a range of the threshold, the optical tracking is automatically selected; and
   in a case that the update accuracy of the external environment image in the control end database is less than a preset accuracy standard value or an optical FOV of the handle camera is out of the range of the threshold, an electromagnetic tracking is automatically selected.

8. A method for controlling a Virtual Reality (VR) system, applied to the adaptive VR system as claimed in claim 1, comprising:
   respectively acquiring an external environment image in a headset coordinate system and an external environment image in a handle coordinate system by a headset camera and a handle camera, and storing the external environment image of the handle coordinate system in a control end database;
   determining a tracking mode used for tracking a handle according to an update accuracy of the external environment image of the handle coordinate system in the control end database, and the tracking mode comprising optical tracking and electromagnetic tracking;
   when the optical tracking is used, performing coordinate system conversion on the external environment image of the headset coordinate system and the external environment image of the handle coordinate system, so that the external environment image acquired by the headset camera and the external environment image acquired by the handle camera are in the same coordinate system, and the optical tracking is completed; and
   when the electromagnetic tracking is used, receiving an electromagnetic signal transmitted by an electromagnetic transmitting module arranged on the handle by an electromagnetic receiving module arranged on a headset to complete the electromagnetic tracking of the handle.

9. A non-transitory computer-readable storage medium, a computer program is stored in the computer-readable storage medium, when the computer program is executed by a processor, the computer program implements the steps of the method as claimed in claim 8.

10. An electronic device, comprising: a memory, a processor, and a computer program that is stored on the memory and executable on the processor, wherein the processor, when executing the computer program, implements the steps of the method as claimed in claim 8.

11. A method for controlling a VR system, applied to the adaptive VR system as claimed in claim 2, comprising:
  respectively acquiring an external environment image in a headset coordinate system and an external environment image in a handle coordinate system by a headset camera and a handle camera, and storing the external environment image of the handle coordinate system in a control end database;
  determining a tracking mode used for tracking a handle according to an update accuracy of the external environment image of the handle coordinate system in the control end database, and the tracking mode comprising optical tracking and electromagnetic tracking;
  when the optical tracking is used, performing coordinate system conversion on the external environment image of the headset coordinate system and the external environment image of the handle coordinate system, so that the external environment image acquired by the headset camera and the external environment image acquired by the handle camera are in the same coordinate system, and the optical tracking is completed; and
  when the electromagnetic tracking is used, receiving an electromagnetic signal transmitted by an electromagnetic transmitting module arranged on the handle by an electromagnetic receiving module arranged on a headset to complete the electromagnetic tracking of the handle.

12. A method for controlling a VR system, applied to the adaptive VR system as claimed in claim 3, comprising:
  respectively acquiring an external environment image in a headset coordinate system and an external environment image in a handle coordinate system by a headset camera and a handle camera, and storing the external environment image of the handle coordinate system in a control end database;
  determining a tracking mode used for tracking a handle according to an update accuracy of the external environment image of the handle coordinate system in the control end database, and the tracking mode comprising optical tracking and electromagnetic tracking;
  when the optical tracking is used, performing coordinate system conversion on the external environment image of the headset coordinate system and the external environment image of the handle coordinate system, so that the external environment image acquired by the headset camera and the external environment image acquired by the handle camera are in the same coordinate system, and the optical tracking is completed; and
  when the electromagnetic tracking is used, receiving an electromagnetic signal transmitted by an electromagnetic transmitting module arranged on the handle by an electromagnetic receiving module arranged on a headset to complete the electromagnetic tracking of the handle.

13. A method for controlling a VR system, applied to the adaptive VR system as claimed in claim 4, comprising:
  respectively acquiring an external environment image in a headset coordinate system and an external environment image in a handle coordinate system by a headset camera and a handle camera, and storing the external environment image of the handle coordinate system in a control end database;
  determining a tracking mode used for tracking a handle according to an update accuracy of the external environment image of the handle coordinate system in the control end database, and the tracking mode comprising optical tracking and electromagnetic tracking;
  when the optical tracking is used, performing coordinate system conversion on the external environment image of the headset coordinate system and the external environment image of the handle coordinate system, so that the external environment image acquired by the headset camera and the external environment image acquired by the handle camera are in the same coordinate system, and the optical tracking is completed; and
  when the electromagnetic tracking is used, receiving an electromagnetic signal transmitted by an electromagnetic transmitting module arranged on the handle by an electromagnetic receiving module arranged on a headset to complete the electromagnetic tracking of the handle.

14. A method for controlling a VR system, applied to the adaptive VR system as claimed in claim 5, comprising:
  respectively acquiring an external environment image in a headset coordinate system and an external environment image in a handle coordinate system by a headset camera and a handle camera, and storing the external environment image of the handle coordinate system in a control end database;
  determining a tracking mode used for tracking a handle according to an update accuracy of the external environment image of the handle coordinate system in the control end database, and the tracking mode comprising optical tracking and electromagnetic tracking;
  when the optical tracking is used, performing coordinate system conversion on the external environment image of the headset coordinate system and the external environment image of the handle coordinate system, so that the external environment image acquired by the headset camera and the external environment image acquired by the handle camera are in the same coordinate system, and the optical tracking is completed; and
  when the electromagnetic tracking is used, receiving an electromagnetic signal transmitted by an electromagnetic transmitting module arranged on the handle by an electromagnetic receiving module arranged on a headset to complete the electromagnetic tracking of the handle.

15. A method for controlling a VR system, applied to the adaptive VR system as claimed in claim 6, comprising:
  respectively acquiring an external environment image in a headset coordinate system and an external environment image in a handle coordinate system by a headset camera and a handle camera, and storing the external environment image of the handle coordinate system in a control end database;
  determining a tracking mode used for tracking a handle according to an update accuracy of the external environment image of the handle coordinate system in the control end database, and the tracking mode comprising optical tracking and electromagnetic tracking;
  when the optical tracking is used, performing coordinate system conversion on the external environment image of the headset coordinate system and the external environment image of the handle coordinate system, so that the external environment image acquired by the headset camera and the external environment image acquired by the handle camera are in the same coordinate system, and the optical tracking is completed; and when the electromagnetic tracking is used, receiving an electromagnetic signal transmitted by an electromagnetic transmitting module arranged on the handle by an electromagnetic receiving module arranged on a headset to complete the electromagnetic tracking of the handle.

16. A method for controlling a VR system, applied to the adaptive VR system as claimed in claim 7, comprising:

respectively acquiring an external environment image in a headset coordinate system and an external environment image in a handle coordinate system by a headset camera and a handle camera, and storing the external environment image of the handle coordinate system in a control end database;

determining a tracking mode used for tracking a handle according to an update accuracy of the external environment image of the handle coordinate system in the control end database, and the tracking mode comprising optical tracking and electromagnetic tracking;

when the optical tracking is used, performing coordinate system conversion on the external environment image of the headset coordinate system and the external environment image of the handle coordinate system, so that the external environment image acquired by the headset camera and the external environment image acquired by the handle camera are in the same coordinate system, and the optical tracking is completed; and when the electromagnetic tracking is used, receiving an electromagnetic signal transmitted by an electromagnetic transmitting module arranged on the handle by an electromagnetic receiving module arranged on a headset to complete the electromagnetic tracking of the handle.

\* \* \* \* \*

UNITED STATES PATENT AND TRADEMARK OFFICE
CERTIFICATE OF CORRECTION

PATENT NO. : 12,026,299 B2  
APPLICATION NO. : 17/884973  
DATED : July 2, 2024  
INVENTOR(S) : Xiuzhi Zhang et al.

Page 1 of 1

It is certified that error appears in the above-identified patent and that said Letters Patent is hereby corrected as shown below:

On the Title Page

Column 1, add the following section:  
(30) Foreign Application Priority Data  
September 16, 2020     (CN) ...................... 202010973590.1

Signed and Sealed this  
Nineteenth Day of November, 2024

Katherine Kelly Vidal  
*Director of the United States Patent and Trademark Office*